Oct. 24, 1933.  A. HERZ  1,931,493
COMPENSATING DRIVE
Filed Feb. 6, 1929
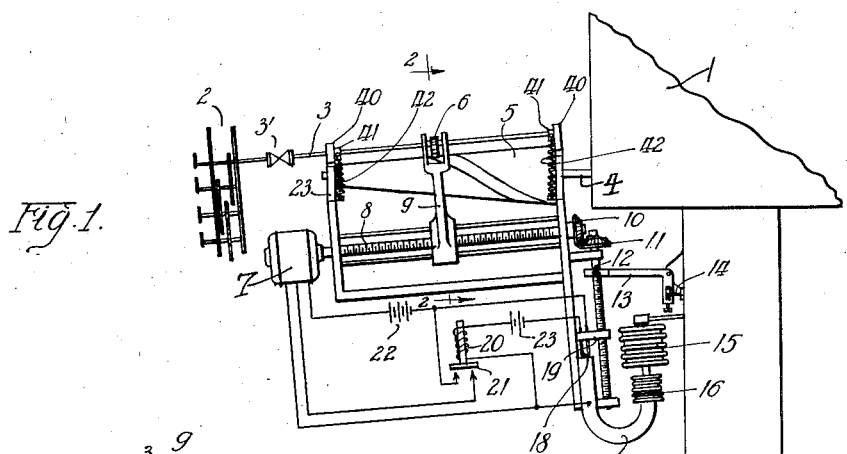
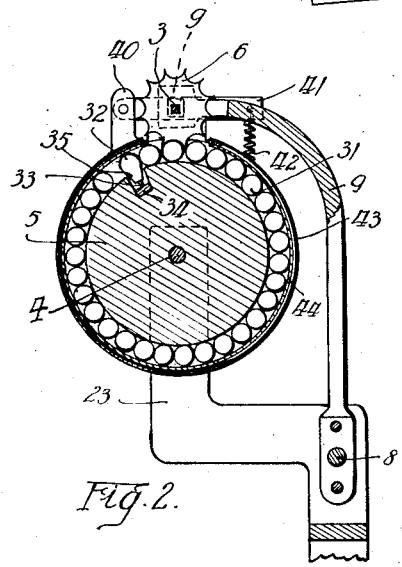
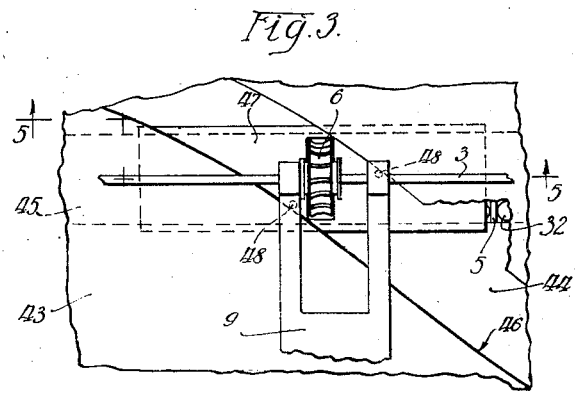
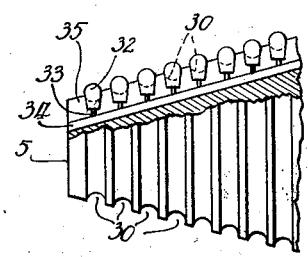
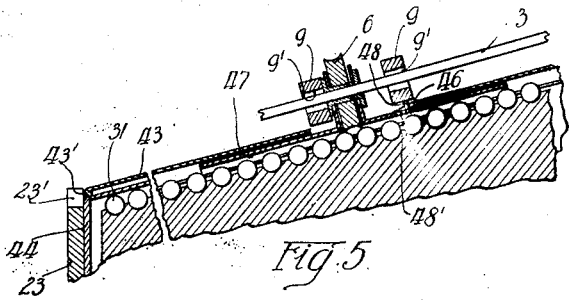
Inventor:
Alfred Herz.
By
Brown Jackson Boettcher Dienner
Attys.

Patented Oct. 24, 1933

1,931,493

UNITED STATES PATENT OFFICE 1,931,493

COMPENSATING DRIVE

Alfred Herz, Chicago, Ill.

Application February 6, 1929. Serial No. 337,741

13 Claims. (Cl. 74—7)

This invention relates to meters and more particularly to a compensating drive for volumetric meters such as are used to measure gas flow.

Commercial meters for measuring commodities such as illuminating gas assess a charge depending upon the number of cubic feet of gas drawn through the meter. The number of cubic feet that a given amount of gas will occupy depends upon the temperature and pressure of the gas and therefor a measure which measures volume only gives rise to inaccuracies if the pressure and temperature of the gas varies to any considerable extent.

In my copending application, Serial No. 232,572, filed November 11, 1927, I disclose a compensating device for gas meters which functions to alter the reading registered by the meter proportionately to the pressure and temperature of the gas flowing through the meter.

In this application the gas actuated moving parts of the meter carried a cone against which a driving wheel rested. This driving wheel was connected to a register mechanism either through another cone or directly. A pressure controlled manometer and a temperature controlled contact set cooperated to control a motor which by means of a screw thread moved the drive wheel axially on the cone to increase or decrease the ratio of the meter.

The amount of power available on the shaft driven by the moving parts of a gas meter is rather small, and in order to satisfactorily transmit power from a smooth face cone to the drive wheel, very accurate adjustments must be maintained. The bearings of the shaft driven by the drive wheel must be properly alined to prevent binding, and the tension adjustment between the drive wheel and the cone must be maintained within very close limits if the drive wheel is to be rotated without slipping and without producing an undue drag upon the moving element of the meter.

The use of a cone of soft material having a high coefficient of friction shortens the life of the mechanism particularly since the endwise movement of the drive wheel drags over the surface of the cone and causes it to wear rapidly. Wear must be compensated by additional tension or slippage will occur and the accuracy of the meter will be impaired. Also materials which are most satisfactory for a drive of this kind are hygroscopic to a considerable extent and their use renders the meter susceptible to atmospheric changes.

In my present invention I have provided a new and improved driving arrangement for systems of this kind, an arrangement which gives a positive drive at all times without imposing excessive loads upon the moving parts of the meter.

To this end I have replaced the smooth faced cone of my copending application with a cone containing a plurality of round bottom grooves each of which is preferably filled with a plurality of balls, the number in each groove being in direct proportion to the length of the groove. The driving wheel is a star wheel, the teeth of which engage the balls positively even when a very moderate pressure is applied between the two. In each of the grooves I also provide a pin somewhat flexibly mounted and against which the balls bear to key themselves with respect to the cone so that they are not free to rotate on the cone and therefore are capable of driving the star wheel.

The use of balls, such as steel ball bearings in a round bottom groove, is preferable, although a disc or washer rolling in a rectangular slot may be substituted. The ball arrangement has certain advantages however and is particularly advantageous for the ease with which the star wheel can be moved over the surface of the balls in one row into engagement with the next row. The balls can rotate laterally in the slot, that rotation assisting in the transfer of the star wheel from row to row.

The star wheel is mounted upon a shaft and is free to move lengthwise of that shaft within limits defined by the arms of a spider. The spider is driven by the compensating motor to adjust the ratio of the meter drive as before. The shaft carrying the driving wheel is mounted to permit limited motion radially with respect to the cone so that the driving wheel may hop or ride over the surface of the balls when the spider moves it from row to row.

In order to prevent the balls on the underside of the cone from falling out of the slot, I have incased the cone in a stationary housing against the inside surface of which the balls bear and roll as the cone moves. This stationary housing is provided with a slot on the upper side of the cone which runs lengthwise of the cone, and the driving wheel engages the rows of balls through this slot.

In order to prevent the entrance of dirt into the rows of balls through this slot in the stationary housing, and to prevent the dislodgement of balls in those rows which are not in engagement with the driving wheel, I provide a rotatable cover placed outside of the stationary housing. This cover contains a spiral slot which is made to cross the slot in the stationary housing at a point directly beneath the star wheel by means of pins carried on the spider arm.

By this arrangement, when the driving wheel is centered upon one row of balls, the rows immediately adjacent on either side of this particular row are also exposed, through the opening defined by the registration of the lengthwise and spiral slots.

This opening is of sufficient width to expose a part of 3 or 4 of the rows on the cone. To protect these rows, I provide a small movable shutter disposed between the movable outer cover and the stationary inner housing and carried on and by the drive wheel bushing. This small cover has a hole in it just large enough to permit engagement of the star wheel with one row of balls, so that the unused rows are covered at all times.

By this arrangement, I have provided a new and improved compensated drive for meters of this class, an arrangement which is positive in its action, reliable over wide variations in temperatures and atmospheric conditions, and inexpensive to install and maintain.

The details of my invention can best be understood with reference to the accompanying drawing, in which I have illustrated a preferred form of the invention to enable one skilled in the art to acquire an understanding of it, and in which:

Figure 1 is a diagrammatic view of my invention applied to a gas meter;

Figure 2 is a sectional detailed view of Figure 1 taken along the line 2—2, looking in the direction of the arrows;

Figure 3 is a fragmentary detailed plan view of Figure 2, looking downward;

Figure 4 is a detailed view of a portion of the cone; and

Figure 5 is a detailed sectional view of Figure 3, taken along the line 5—5 and looking in the direction of the arrows.

Referring to Figure 1 more in detail, the gas meter is shown diagrammatically at 1. The particular type of gas meter employed is of course immaterial, so long as it provides means for rotating the shaft 4 at a speed proportional to the cubic feet of gas drawn through the meter.

The compensating device comprising the cone 5, and drive wheel 6, is attached to and driven by this shaft 4. The particular method of attaching the meter may be varied greatly within the teaching of my invention.

The compensating mechanism, which is disclosed in full in my copending application hereinbefore mentioned, is not of the essence of the present invention, and reference is hereby made to my copending application for a detailed explanation of its operation.

Briefly the compensating mechanism comprises the pressure element 15, connected to the outlet pipe of the meter, and acting upon the pressure element 16 which is connected to the manometer tube 17. Within this tube is a mercury column, maintained in engagement with contacts 18 which are carried by arbor 19 upon the screw thread 12. Contacts 18 control the motor 7 and the relay 20, normally maintaining relay 20 energized when the compensating means is set correctly. A lowering of the pressure of the gas flowing through the meter lowers the level of the mercury column and moves it out of engagement with the contacts 18 to deenergize the relay 20.

The deenergization of the relay 20 closes the circuit of the motor 7 which turns to rotate the screw 8, thereby altering the position of the spider and the drive wheel 6 with respect to the cone, and to rotate the screw shaft 12 through gears 10 and 11 to lower the bushing 19 and the contacts 18 so that the contacts 18 again dip into the mercury and close the circuit of relay 20.

The temperature compensation comprises thermal element 14 which operates against the bell crank 13 to raise the screw shaft 12 to move the contacts 18 out of engagement with the mercury, or to move it downward to engage the second one of the contacts 18 with the mercury. The motor is thus energized over a circuit controlled either through the back contact of relay 20 or through the second contact 18, and rotated in one direction or the other to move the drive wheel 6 with respect to the cone 5 and to readjust the contacts 18 with respect to the mercury column. The gearing driven by the motor 7 to drive the arbor 19 to raise or lower the contacts 18 with respect to the level of the mercury in the tube 17, comprises a follow up device which causes the contacts to follow the movement produced by the pressure element 16, or reverse the movement produced by the thermal element 13.

In the present invention the star wheel 6 is mounted upon the square shaft 3, which is connected to the registering mechanism of the meter through a flexible coupling 3'. This registering mechanism is of the usual type employed for gas meters, and registers the number of cubic feet passing through the meter. The shaft 3 is supported by the levers 41 which are pivoted to bosses 40 disposed on opposite ends of the cone 5. These bosses may either be attached to the stationary housing 44 surrounding the cone, or may be extensions of the frame member 23.

The levers 41 are pulled down by the coil springs 42, best seen in Figure 2, to apply the proper tension between the drive wheel 6 and the balls 31 on the cone. This pivoting of the levers 41 permits limited movement of the drive wheel 6, radially with respect to the cone, to thereby enable the drive wheel to ride up over the surface of the balls when it is being moved from one row to another.

From Figure 5 it will be seen that the width or thickness of the star wheel 6 is exactly equal to the distance between centers of the balls in adjacent rows. That is, the thickness of the star wheel equals the diameter of a ball plus the distance between the rows. The necessity for this dimension will be brought out hereinafter. Further, the teeth of the star wheel are hollowed so that when the wheel is riding squarely on a row of balls, the concavity of the teeth and convexity of the ball keep the wheel in alignment with the row and a large surface is presented for the transmission of power from ball to wheel. When the wheel gets out of alignment, as it will when it is being moved from one row to the next, the bearing of the wheel on the balls is along a thin line rather than a broad surface, that is the bearing is a knife edge bearing. A knife bearing on a sphere is unstable, thus causing the wheel to move in jumps from row to row and to quickly realign itself with the new row.

The cone 5 contains as many grooves as there are rows of balls in the device, and contains one slot 35, best seen in Figure 4, running longitudinally of the cone. This slot is rectangular in shape and deeper than the grooves on the cone. Within this slot is a comb comprising the base 34 to which the pins 32 are attached by the flexible mounting member 33. The member 33 is preferably a small spring through the movement of which the assembly may be flexed in all directions within the limits of the space in the grooves in which the pin 32 is located. The number of pins 32 corresponds with the number of grooves 30 in the surface of the cone. These pins serve to lock the balls in the groove to prevent their rotation around the cone.

The cone 5 is mounted upon the shaft 4 of the meter, and incased in the stationary sheet metal housing 44, which is preferably attached to the frame member 23, and which completely incases the cone. The housing 44 is provided with a lengthwise slot 45 disposed on the upper face of the cone and running parallel to the shaft 4. The star wheel 6 projects through this slot 45 to engage the balls on the cone. The housing 44 is spaced away from the surface of the cone sufficiently to permit the balls 31 to ride freely around the cone by bearing against the inner face of the housing 44 when on the lower side of the cone.

Around the housing 44 is a movable sheet metal cover 43 which is provided with a spiral slot 46 into which the pins 48, carried by the spider 9 and best seen in Figs. 3 and 5, are projected to rotate the cover 43 when the spider is moved by the motor. The ends of the cover 43 are turned over to form the round cylinder-like end 43', which bears against the frame 23, or against a projection of the housing 44, to prevent a lengthwise dislodgement of the cover.

The registration of the spiral slot 46 and the longitudinal slot 45 leaves an open space through which the balls on the cone are exposed.

This opening is in the shape of a parallelogram, and exposes part of 4 or 5 of the rows only one of which is engaged by the star wheel 6. To protect the rows of balls so exposed, I attach a small rectangular shutter 47 to the bushing carried by the star wheel 6. This shutter 47 closes that portion of the opening not needed by the star wheel 6, moves with the star wheel lengthwise in the slot 45, and is disposed between the stationary housing 44 and the movable cover 43.

When the star wheel is engaging a row of balls at the extreme end of the cone, the shutter extends beyond the housing 44 for a short distance. To permit this extension that portion of the rolled edge 43' of the cover 43 which is adjacent to the end of the spiral slot 46 and is then aligned with the slot 45, is cut away, and a slot 23', Fig. 5, is cut in the frame member 23.

The shutter 47 is made of a light sheet metal preferably aluminum, so that it will not effect an appreciable drag on the star wheel 6 when that wheel is moving it. The rolled edge 43' of the cover spaces it away from the housing, and since the roll 43' is larger than the thickness of 47, the latter slides freely under the control of the star wheel. If desired, a keyway or slot 48' may be cut in the shutter and the spider pins 48 projected therein to positively align the shutter, however because of its shape, which is circular laterally, the shutter aligns itself readily without the aid of pins 48, and their use is optional.

Referring to Figure 2 and assuming the cone 5 to be rotated in a clockwise direction, the operation of the drive is as follows: The pin 32 pushes the balls 31, causing them to rotate in the groove 30 and around the housing 44. The balls 31 do not completely fill the space in the groove, that is, the circumference of a circle passed through the diameters of the balls is slightly greater than the sum of the diameters of the individual balls, so that there is a small amount of play between the balls. The teeth on the drive wheel 6 ride in this space between the balls and over the outer surface of a ball with an engagement simulating that of gear teeth, so that the wheel 6 is positively turned by the movement of the cone 5. The end of the pin 32 is of the same diameter as a ball, and of similar shape, and the star wheel 6 rides over it in the same manner.

The width of the star wheel 6 is exactly equal to the distance between the center of adjacent rows of balls, as seen in Fig. 5, that is, it is equal to the diameter of the ball plus the distance between adjacent rows. The wheel 6 is loosely mounted within the spider 9, and capable of limited lengthwise motion within that spider to thereby insure that the wheel will ride squarely up on one of the row of balls.

When the motor 7 is actuated by the compensating device to move the spider arm, the wheel 6 is not immediately moved but rather the arm 9 moves over into engagement with the bushing carried by the wheel 6. As the arm 9 continues to move, the wheel 6 is raised up over the surface of the balls, in adjacent rows, the shaft 3 moving outward against the tension of spring 42 and moving with respect to the spider 9 in the slot 9'.

When the wheel 6 has reached a position shown in Fig. 5 with its edges centered squarely upon the balls in adjacent rows, the tension of spring 42 pulls it down rapidly, the edges of the wheels sliding over the surface of the ball to move the wheel and bushing with respect to the spider 9. The cover 47 is moved by the bushing of the wheel 6, to thereby insure that the row of balls from which the wheel has departed is completely covered to prevent any of the balls in that row from jumping out of the slot. If the spider continues moving in the same direction, the wheel 6 gradually rides up over the next two balls in adjacent rows, and again jumps ahead when its edges have passed the center of the balls.

By this arrangement, the gear ratio between the meter and the register is changed in correspondence with the different numbers of balls in adjacent rows on the cone surface. It is true that some slight variation is encountered when the wheel 6 moves from one row to another, that is, some motion is lost or gained, but this introduces so small an error as to be of no consequence, particularly since it is a transient error and does accumulate with time.

As the spider 9 moves forward, the pins 48 bear against the edge of the slot 46 to rotate the outer cover 43 in a direction corresponding to the motion of the spider. This covers the rows of balls behind the star wheel, and uncovers those ahead of the star wheel, to give the star wheel access to the rows with which it is brought into engagement by the spider movement.

The gear-like action exercised upon the star wheel by the walls in a row affords a positive drive, and does not require a great amount of tension between the star wheel and the balls since the amount of power to be transmitted is slight. The drive of the register mechanism is thereby made positive, without subjecting the meter to a heavy load such as would be required if friction alone were relied upon to drive the register. The amount of compensation depends upon the difference in diameters between the small and large ends of the cone and the consequent difference in the number of balls resting in each of the slots on the cone. Inasmuch as the pressure and temperature variations encountered in a gas system are relatively small, a wide variance in the gear ratio is not required, and a minimum of 1–1 gear ratio and a maximum of 1½–1 has been found to be satisfactory.

Since there are different number of balls in each of the rows on the cone, the star wheel will not ride squarely between adjacent balls in a row as it is being moved from one row to another, but rather will often times strike squarely upon the top of a ball.

A slight movement of the cone 5 will dislodge the star wheel from the top of the ball and cause it to project its teeth between adjacent balls in the row, however, but a slight rotation will be lost or gained by such operation. Then too, the balls in the row are not tightly fixed with respect to each other, and some motion is lost with each revolution of the cone. However, both of these errors are very slight, and no difficulty has been experienced in maintaining a gas meter accurate within the required one percent with the arrangements shown in the drawing.

While I have chosen to show my invention in connection with a preferred embodiment of it, I have done so by way of the example only as there are many modifications and adaptions which can be made by one skilled in the art without department from the teachings of the invention.

Having thus complied with the statutes and shown and described a preferred form of my invention, what I consider new and desire to have protected by Letters Patent is pointed out in the appended claims.

1. In a device of the class described, a driven cone, said cone having a plurality of grooves disposed parallel to its base, a plurality of balls disposed in said grooves, means for locking the balls against rotation around the cone in said grooves, means for holding the balls in the grooves, a spider, a star wheel carried thereby, means for holding said star wheel in engagement with the balls in one of said grooves, a shaft driven through said cone and star wheel at a rate dependent upon the ratio afforded by the cone and star wheel, and means for moving said spider to alter said ratio.

2. In a device of the class described, a rotatable cone having a plurality of grooves disposed parallel to its base, a row of balls disposed in each groove, means for locking the balls against rotation around the cone in said grooves, a housing around said cone and balls and having a longitudinally disposed slot, a cover around said housing and having a spiral slot registering with said longitudinal slot to expose a portion of said rows of balls, a star wheel, a shutter having an opening registering with said slots to expose one of said rows, said star wheel extending through said opening into driving engagement with the balls of said exposed row, means for moving said cover to cover some of the rows of balls exposed through said slots and to uncover other rows, said means also moving said star wheel from one row of balls to another to alter the driving ratio, means carried by said star wheel for moving said shutter to expose only the row of balls with which the star wheel is engaged, and means for holding the star wheel in engagement with the balls.

3. A meter driven device of the class described comprising a driven cone provided with a plurality of grooves which are in planes normal to the axis of the cone, said cone also being provided with a slot running lengthwise of said cone, pins, means for flexibly mounting the pins in said slot and registering with said grooves, there being a pin for each of said grooves, a row of balls in each groove, means for retaining said balls in said grooves, a register driving star wheel held in engagement with and driven by the pin and balls of one of said rows, means for moving said star wheel from one row to another to alter the ratio of movement of said star wheel with respect to the movement of said cone, and means for holding the star wheel in engagement with the balls.

4. In a meter driven device of the class described, a shaft, a star wheel mounted on said shaft, the mounting permitting movement of said wheel lengthwise of said shaft and preventing rotation of one with respect to the other, a cone, said cone having grooves adapted to receive balls in planes normal to the axis of the cone, rows of balls mounted on said cone in said grooves and disposed adjacent to said wheel, one of which rows is engaged by the star wheel, means for retaining the balls on the cone, means for preventing the balls revolving around the axis of the cone, means for moving said star wheel from one row over the surface of said balls into engagement with the next row, and a mounting for said shaft yielding to movement away from said cone when said wheel rides over a ball.

5. In a transmission of the class described, a plurality of rows of balls, means for supporting said rows of balls so that each row is in a plane normal to a common axis, means connected with the supporting means for preventing movement of said balls about said axis with respect to the supporting means, a star wheel engaging one of said rows, a shaft supporting said wheel, the support permitting a lengthwise sliding of the wheel on the shaft and preventing rotation of the wheel with respect to the shaft, a spider having arms disposed on opposite sides of said wheel, said arms having openings through which said shaft extends, means for moving said spider to push the wheel along said shaft, said wheel riding over the tops of said balls meanwhile, said rows of balls being moved to drive said wheel and shaft, and means for retaining the balls on the supporting means.

6. In a transmission of the class described, a plurality of evenly spaced rows of balls containing a different number of balls in each row, means for supporting said rows of balls and for retaining the balls in the rows and for preventing their movement along the rows, a wheel having teeth conforming to the shape of said balls, said wheel having a thickness equal to the distance between the centers of adjacent ones of said rows of balls, means for holding said wheel in engagement with said balls including a spider adapted for movement relative to said wheel, and means moving at a uniform rate and acting through said spider for moving said wheel at right angles to said rows, the edges of said wheel riding over the surface of the balls in adjacent rows until the high spot of the ball is reached, the wheel then stepping away from a portion of said spider as the wheel edges slide down over the leading face of the ball to bring the wheel into engagement with the next row, to thereby alter the number of revolutions made by said wheel per revolution of the support.

7. A variable drive between a meter and a register, comprising a cone frustrum member having a plurality of grooves disposed on its surface in planes perpendicular to the axis of the cone, a row of balls disposed in each of said grooves, means for limiting the movement of said balls longitudinally of said grooves, means for holding said balls in said grooves, a star wheel member, means for holding said star wheel member in engagement with said balls, said balls driving said star wheel, means for moving said star wheel member from row to row to thereby alter the ratio of rotation of said star wheel member to that of said cone member.

8. In a transmission of the class described, a right cone frustrum having a plurality of grooves disposed on said cone parallel to its base, a row of balls disposed in each of said grooves, means for retaining the balls in the grooves, means for limiting the movement of said balls longitudinally of said grooves, a stationary housing surrounding said cone and spaced away therefrom to form a guide against which said balls rest, said housing having a slot running lengthwise through it, a star wheel, means including a shaft for mounting said star wheel so that its periphery extends though said slot into driving engagement with said balls, and means for moving said star wheel in said slot from one of said rows to another.

9. In a transmission of the class described, a cone having a plurality of grooves in its surface and parallel to its base, pins flexibly mounted, one in each groove, a plurality of balls disposed in each groove, said balls being free to rotate about their centers in the grooves and restrained by said pins from rolling lengthwise around the grooves, means for holding the balls in the grooves, a rotatable star wheel engaging said balls one row at a time, means for holding said wheel in engagement with said balls, and means for moving said star wheel onto the crest of a ball in one row from which crest the rotation of said ball assists said means in stepping the wheel to the adjacent row.

10. In a compensating drive for meters, a meter driven cone having a plurality of grooves in its surface parallel to its base, pins, means for flexibly mounting a pin in each of said grooves, a plurality of balls disposed in each of said grooves, said balls being free to rotate about their centers in the grooves and restrained by said pins from rolling lengthwise around the grooves, means for holding the balls in the grooves, a register driving star wheel engaging said balls one row at a time, means for holding said wheel in engagement with said balls, a spider arm having an opening in which said star wheel is disposed in which opening said wheel may make limited movement responsive to a rotation of said balls to center the wheel on a row of balls, and means for moving said spider to move said star wheel onto the crest of the balls of that row from which crest the rotation of said ball assists said spider in stepping the wheel to the adjacent row.

11. In a device of the class described, a cone having a plurality of grooves in its conical surface and in planes normal to its axis, pins, means for flexibly mounting a pin in each of said grooves, a plurality of circular bodies disposed in each groove, means for holding said bodies in said grooves, said bodies being restrained by said pins from rolling lengthwise around said grooves, a star wheel engaging the bodies in one of said grooves, means for holding said wheel in engagement with said bodies, and means for moving said star wheel from one groove to the next.

12. In a compensating drive for meters, a meter driven cone, a plurality of evenly spaced rows of circular bodies on said cone, there being a different number of circular bodies in each row, a pin flexibly disposed in each of said rows, a register driving wheel having teeth conforming to the shape of said bodies, said wheel having a thickness equal to the distance between centers of adjacent ones of said rows of bodies, means for moving said wheel from row to row to thereby change the number of revolutions made by said wheel for revolution of the cone, means for holding said wheel in engagement with said bodies, means on said cone for receiving said bodies, and means for preventing movement of said bodies longitudinally thereof, and means for retaining the bodies on the cone.

13. In a device of the class described, a shaft, a star wheel mounted on said shaft, said mounting permitting lengthwise movement of said wheel on said shaft and preventing rotation of one with respect to the other, a cone, rows of circular bodies on said cone adjacent to said wheel, one of said rows being engaged by said wheel, a pin flexibly disposed in each of said rows, means for moving said wheel from one row to another, a mounting for said shaft which yields to outward movement when said wheel rides over one of said bodies as it is moved from row to row, means on said cone and extending in a plane normal to the axis of the cone for receiving the bodies in rows, means retaining said bodies on the cone, and means for preventing movement of said bodies longitudinally of said receiving means.

ALFRED HERZ.